United States Patent
Cohen (10) Patent No.: US 8,955,690 B2
(45) Date of Patent: Feb. 17, 2015

(54) AGRICULTURAL EMITTER INCLUDING A FILTER AND METHOD OF USING SAME

(75) Inventor: Amir Cohen, Yuvalim (IL)

(73) Assignee: Amirim Products Development & Patents Ltd., Yuvalim (IL)

(*) Notice: Subject to any disclaimer, the term of this patent is extended or adjusted under 35 U.S.C. 154(b) by 0 days.

(21) Appl. No.: 13/881,401

(22) PCT Filed: Oct. 25, 2011

(86) PCT No.: PCT/IL2011/000824
§ 371 (c)(1),
(2), (4) Date: Apr. 25, 2013

(87) PCT Pub. No.: WO2012/056448
PCT Pub. Date: May 3, 2012

(65) Prior Publication Data
US 2013/0213905 A1    Aug. 22, 2013

(30) Foreign Application Priority Data

Oct. 25, 2010    (GB) .................................. 1017985.1

(51) Int. Cl.
| | | |
|---|---|---|
| B01D 29/62 | (2006.01) | |
| B01D 35/02 | (2006.01) | |
| B01D 35/12 | (2006.01) | |
| B01D 35/22 | (2006.01) | |
| B01D 35/16 | (2006.01) | |
| B01D 29/88 | (2006.01) | |
| A01G 25/02 | (2006.01) | |
| A01G 25/16 | (2006.01) | |
| B05B 15/02 | (2006.01) | |

(52) U.S. Cl.
CPC .............. *A01G 25/02* (2013.01); *A01G 25/023* (2013.01); *B05B 15/0216* (2013.01)
USPC .......... 210/425; 210/108; 210/390; 210/393; 210/407; 210/411; 210/422; 210/424; 210/427

(58) Field of Classification Search
None
See application file for complete search history.

(56) References Cited

U.S. PATENT DOCUMENTS

| 780,334 | A | * | 1/1905 | Freeman | .................. | 210/390 |
| 3,348,694 | A | * | 10/1967 | Smith | ................ | 210/390 |
| 3,779,388 | A | * | 12/1973 | Coughlin | ................ | 210/390 |

(Continued)

FOREIGN PATENT DOCUMENTS

| BE | 895982 | 8/1983 |
| EP | 1884157 | 2/2008 |
| WO | WO 2012/056448 | 5/2012 |

OTHER PUBLICATIONS

International Preliminary Report on Patentability Dated May 10, 2013 From the International Bureau of WIPO Re. Application No. PCT/IL2011/000824.

(Continued)

*Primary Examiner* — Benjamin Kurtz (57) ABSTRACT

An unclogging filter apparatus has an irrigation outlet and a flushing outlet. A filtering element moves between at least an operational position and a flushing position. When the filtering element is in the operational position substantially all of the fluid flowing into the apparatus is directed out the irrigation outlet, while the filtering element is disposed for removing a particle from the fluid flowing into the apparatus. When the filtering element is in the flushing position, the filtering element is disposed for flushing the particle out the flushing outlet.

11 Claims, 6 Drawing Sheets

(56) References Cited

U.S. PATENT DOCUMENTS

| | | | |
|---|---|---|---|
| 3,918,646 | A | 11/1975 | Leal-Diaz et al. |
| 3,970,251 | A | 7/1976 | Harmony |
| RE29,022 | E | 11/1976 | Spencer |
| 4,032,072 | A | 6/1977 | McElhoe et al. |
| 4,059,228 | A | 11/1977 | Werner |
| 4,209,133 | A | 6/1980 | Mehoudar |
| 4,331,293 | A | 5/1982 | Rangel-Garza |
| 4,344,576 | A | 8/1982 | Smith |
| 4,623,094 | A | 11/1986 | Smeyers |
| 4,682,730 | A | 7/1987 | Smeyers |
| 4,806,258 | A * | 2/1989 | Duncan .................. 210/423 |
| 5,183,208 | A | 2/1993 | Cohen |
| 5,279,462 | A | 1/1994 | Mehoudar |
| 5,400,973 | A | 3/1995 | Cohen |
| 5,615,838 | A | 4/1997 | Eckstein et al. |
| 5,634,594 | A | 6/1997 | Cohen |
| 6,250,571 | B1 | 6/2001 | Cohen |
| 2002/0070297 | A1 | 6/2002 | Bolinis et al. |
| 2005/0121401 | A1* | 6/2005 | Walton et al. ............... 210/791 |
| 2009/0029434 | A1 | 1/2009 | Tsai et al. |
| 2010/0163651 | A1 | 7/2010 | Feith et al. |
| 2011/0186652 | A1 | 8/2011 | Cohen |
| 2012/0097196 | A1 | 4/2012 | Cohen |
| 2012/0097254 | A1 | 4/2012 | Cohen |

OTHER PUBLICATIONS

Office Action Dated Jun. 26, 2013 From the Israel Patent Office Re. Application No. 215931 and Its Translation Into English.

Communication Pursuant to Article 94(3) EPC Dated Nov. 30, 2012 From the European Patent Office Re. Application No. 11186539.0.

Communication Pursuant to Rules 70(2) and 70a(2) EPC and Reference to Rule 39(1) EPC Dated May 2, 2012 From the European Patent Office Re. Application No. 11186539.0.

European Search Report and the European Search Opinion Dated Feb. 23, 2012 From the European Patent Office Re. Application No. 11186539.0.

International Search Report and the Written Opinion Dated May 23, 2012 From the International Searching Authority Re. Application No. PCT/IL2011/000824.

Patents Act 1977: Patents Rules 2007 Report Under Section 15A Dated Oct. 28, 2010 From the Intellectual Property Office of the United Kingdom Re. Application No. GB1017985.1.

Patents Act 1977: Search Report Under Section 17(5) Dated Feb. 11, 2011 From the Intellectual Property Office of the United Kingdom Re. Application No. GB1017985.1.

Communication Under Rule 71(3) EPC Dated Jul. 23, 2013 From the European Patent Office Re. Application No. 11186539.0.

Communication Pursuant to Article 94(3) EPC Dated Feb. 12, 2014 From the European Patent Office Re. Application No. 11794244.1.

Communication Pursuant to Article 94(3) EPC Dated Jul. 11, 2014 From the European Patent Office Re. Application No. 11794244.1.

Office Action Dated May 12, 2014 From the Israel Patent Office Re. Application No. 215931 and Its Translation Into English.

* cited by examiner

AGRICULTURAL EMITTER INCLUDING A FILTER AND METHOD OF USING SAME

RELATED APPLICATION/S

This application is a National Phase of PCT Patent Application No. PCT/IL2011/000824 having International filing date of Oct. 25, 2011, which claims priority of UK Patent Application No. 1017985.1 filed on Oct. 25, 2010.

The contents of the above application are all incorporated by reference as if fully set forth herein in their entirety.

FIELD AND BACKGROUND OF THE INVENTION

The present invention, in some embodiments thereof, relates to an unclogging filter apparatus and, more particularly, but not exclusively, to an apparatus for unclogging an input filter for an agricultural emitter.

With population increase and climate changes, water resources are becoming more scarce, forcing farmers and gardeners to save water and direct irrigation to a close vicinity of target plants. Drip emitters, fed by an irrigation pipe of pressurized water, achieve such a directional irrigation.

Sometimes, dirt accumulates in the emitter and undesired flow restriction up to flow stopping occurs. To prevent entrance of dirt, the inlet opening may be shaped for filtering the water. However, while such a static filtering reduces dirt entrance to the emitter, the filter itself may become clogged. It is very difficult to clear barely accessible fine water passageways. Therefore, it is generally necessary to replace the whole emitter.

Sometimes emitters are installed into thin irrigation tubules. In such cases, dirt may block not only the emitter, but also it may also block the tubules.

U.S. Pat. No. 4,623,094 to Smeyers, discloses an internal notch filter that can be rinsed so that the particles retained by filtering notches are removed through the outlet by the flushing with the liquid. Smeyers also teaches a pre-filter having a diameter, which is larger than the diameter of the inlet. When the dripper is in use, the prefilter is applied against the entrance of the inlet and filters the large impurities contained in the liquid admitted into the dripper. When the dripper is not in use, the pre-filter is removed from the free end of the inlet. The pre-filter may consist of a sieve or diametral bars which stop large particles, such as vegetable fragments, from entering into the dripper.

U.S. Pat. No. 4,331,293 to Rangel-Garza teaches a microfilter formed in the extreme lower part of a bored nipple pivot. Because of its location inside the hoses of dripper or sprinkling lines, the micro-filter will stop the particles which are in the flow of water from entering into the inside of the emitter, avoiding the obstruction of the emitter and at the same time, permitting all of the particles which could not enter into the emitter and which stayed in the dripper of sprinkling hoses, to be easily dislodged upon flushing the lines at their extreme ends, during the normal maintenance of the irrigation systems.

Additional background art includes U.S. Pat. No. 4,059,228 to Werner and European application EP1884157 to Schiedt and Belgian patent application BE895982.

SUMMARY OF THE INVENTION

According to an aspect of some embodiments of the present invention there is provided an apparatus for filtering a fluid for an irrigation emitter. The apparatus may include an irrigation outlet, a flushing outlet, and a filtering element. The filtering element may be movable between at least two positions: an operational position wherein substantially all of the fluid flowing into the apparatus is directed out the irrigation outlet and wherein the filtering element is disposed as at least one part of a filter for removing a particle from the fluid flowing into the apparatus, and a flushing position wherein the filtering element is disposed for flushing the particle out the flushing outlet.

According to some embodiments of the invention, the irrigation outlet may have an inner diameter of between 0.5 and 3.5 mm.

According to some embodiments of the invention, the filter may be configured for the removing the particle when the particle has a diameter of greater than 0.5 mm.

According to some embodiments of the invention, the filter may be configured for the fluid flowing at a rate of less than 8 l/hr.

According to some embodiments of the invention, in the flushing position, the filtering element may be backwashed.

According to some embodiments of the invention, in the flushing position, the filtering element may be disposed to permit fluid including the particle to flow into the apparatus.

According to some embodiments of the invention, in the flushing position, the filtering element may be disposed to permit fluid including the particle to flow through the apparatus and out the flushing outlet.

According to some embodiments of the invention, the filtering apparatus may also include a cavity having at least three openings. A first opening may be to the irrigation outlet. The cavity may have a second opening to the flushing outlet. The cavity may have a third opening to an inlet conduit. The apparatus may further include, a rotatable element having at least two apertures. The rotatable element may be configured for switching between said operational position and said flushing position by rotating within the cavity to align at least one of the at least two apertures with at least one of the at least three openings.

According to some embodiments of the invention, the cavity and the rotatable element may be cylindrical.

According to some embodiments of the invention, the at least one aperture may include the filtering element.

According to some embodiments of the invention, the filtering apparatus may also include a cofiltering element. When the filtering element is in the operational position, the filtering element may be aligned with the cofiltering element to retain a particle. When the filtering element is in the flushing position, the filtering element may be positioned to clear the cofiltering element to pass the particle.

According to some embodiments of the invention, the cofiltering element may further include a wall of the inlet conduit. In the operational position, a narrow channel may be formed between the filtering element and the wall.

According to some embodiments of the invention, the filtering element may be further switchable to a closed position wherein the apparatus is substantially closed to fluid flow.

According to some embodiments of the invention, the irrigation outlet may be configured for reversible attachment to a drip emitter, a sprinkler, and/or an irrigation tubule.

According to some embodiments of the invention, the irrigation outlet may be configured for irreversible attachment to a drip emitter, a sprinkler, and/or an irrigation tubule.

According to an aspect of some embodiments of the present invention there is provided an apparatus for filtering a fluid for drip irrigation. The apparatus may include a flushing outlet, an irrigation outlet and an inlet conduit. The inlet conduit may be connectable to a source of the fluid. The apparatus may also include a filtering element. The filtering element may be configured for moving longitudinally with respect to the inlet conduit for switching between at least two modes. The at least two modes may include an operational mode and a flushing mode. In the operational mode, substantially all of the fluid flowing into the inlet conduit may be directed to the irrigation outlet and the filtering element may be disposed for removing a particle from the fluid flowing into the inlet. In the flushing mode, the inlet conduit may operationally communicate with the flushing outlet and the filtering element may be disposed for flushing the particle to the flushing outlet.

According to some embodiments of the invention, the filtering apparatus may also include a drip irrigation emitter irreversibly attached to the irrigation outlet.

According to some embodiments of the invention, the filtering apparatus may also include a constriction in the inlet conduit. In the operational mode, the filtering element may be aligned to further limit flow through the constriction. In the flushing mode, the filtering element may not further limit flow through the constriction.

According to an aspect of some embodiments of the present invention there is provided an apparatus for filtering a fluid for an irrigation emitter. The apparatus may include an irrigation outlet, a flushing outlet, and an inlet conduit connectable to a source of the fluid. The apparatus may also include a filtering element. The apparatus may further include a substantially cylindrical cavity, and a cylinder having at least two apertures. The cylinder may be mounted in the substantially cylindrical cavity for rotating between at least two positions: an operational position wherein substantially all of the fluid flowing into the inlet conduit is directed out the irrigation outlet and wherein the filtering element is disposed for removing a particle from the fluid flowing into the inlet conduit, and a flushing position wherein the inlet conduit communicates with the flushing outlet and the filtering element is disposed for flushing the particle to the flushing outlet.

According to some embodiments of the invention, the filtering apparatus may also include a cofiltering element. In the operational position, the cofiltering element may be aligned with the filtering element forming a narrow channel. In the flushing position, the cofiltering element may be separated from the filtering element.

According to an aspect of some embodiments of the present invention there is provided a method of irrigation. The method may include supplying water to an emitter via a filter in an operational mode, and switching the filter into a flushing mode to flush a particle out a flushing outlet of the filter.

According to some embodiments of the invention, the fluid may be supplied at a rate of less than 8 l/hr.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1C' is a close up view of the flushing outlet of a first embodiment of a flushing agricultural emitter filter cleaner in a closed mode;

FIG. 2A' is an expanded view of section A of FIG. 2A;

DESCRIPTION OF SPECIFIC EMBODIMENTS OF THE INVENTION

The present invention, in some embodiments thereof, relates to an unclogging filter apparatus and, more particularly, but not exclusively, to an apparatus for unclogging an input filter for an agricultural emitter.

In an exemplary embodiment of the invention, an unclogging filter apparatus may have two modes defined by movement of one or more components: an operational mode and a flushing mode. In the operational mode, a filtering element may be disposed so as to allow fluid to enter the emitter but to prevent particles from entering the emitter. In the flushing mode, the filter element may be disposed so as to open a flushing outlet and to allow particles and/or water flowing through the inlet to flow freely across the filtering element and exit out the flushing outlet. The unclogging filter apparatus may be integrated with an agricultural emitter (for example a drip emitter) and/or it may have an outlet for irreversible or reversible connection to a separate device (for example a separate agricultural emitter).

Movement of the filtering element with respect to other elements may be linear or rotational or along a curved pathway or a combination of movements. In the flushing mode, the filtering element may be cleaned by back flushing or filtering channels may be opened and/or cleaned by forward flushing or a combination of the two.

For example, the filter is optionally designed to detain particles of diameter greater than 0.3-1.0 mm. The inlet conduit may have an inner diameter of about 1.0-3.5 mm while a constriction may have an inner diameter of 0.3-3.0 mm. In some embodiments, the flushing outlet may have a diameter that is close to or greater than the inlet constriction diameter by about 20%. In some embodiments, the flushing outlet diameter may be for example between 0.5-3.5 mm. Optionally, the filter may be adjustable. For example, the user may adjust the diameter of narrow filtering channels by twisting or sliding two parts with respect to each other. Optionally there may be a mark on the outside of the apparatus to indicate the size of the filtering channels.

A user of the apparatus may deploy, for example, one or more apparatuses in a field in an operational mode for irrigation. In some cases, the apparatus and/or an associated tubule may be cleaned periodically and/or as needed, (for example when an emitter stops working). The apparatus and/or tubule may be cleaned by turning on the water pressure and setting the apparatus to the flushing mode. Fluid and/or particles may then be flushed through the tubule past the filtering element and out the flushing outlet.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1A:
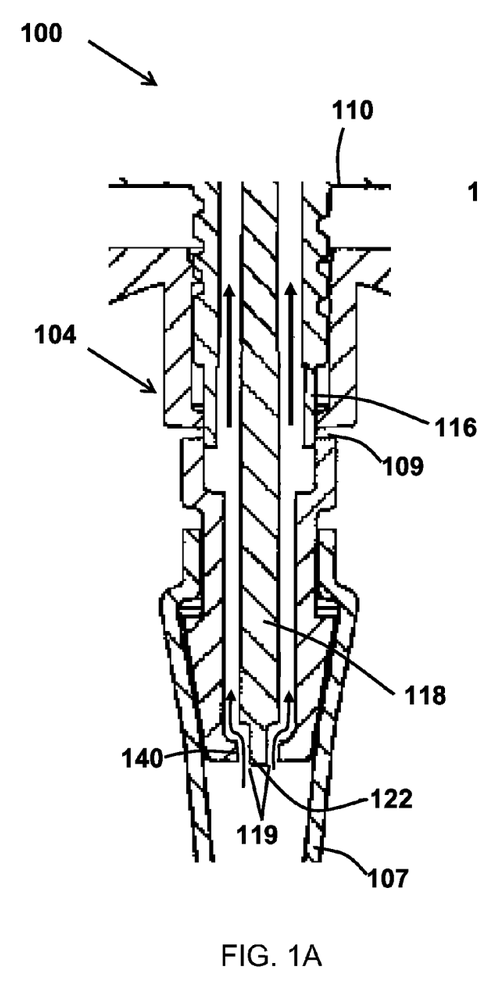
FIG. 1A is a first embodiment of a flushing agricultural emitter filter cleaner in an operational mode.
Figure 1B:
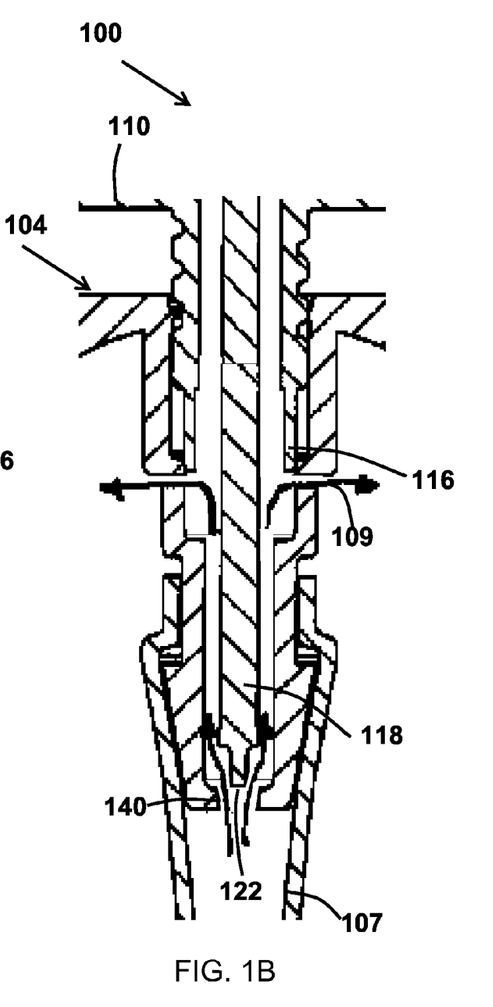
FIG. 1B is a first embodiment of a flushing agricultural emitter filter cleaner in a flushing mode.
Figure 1C:
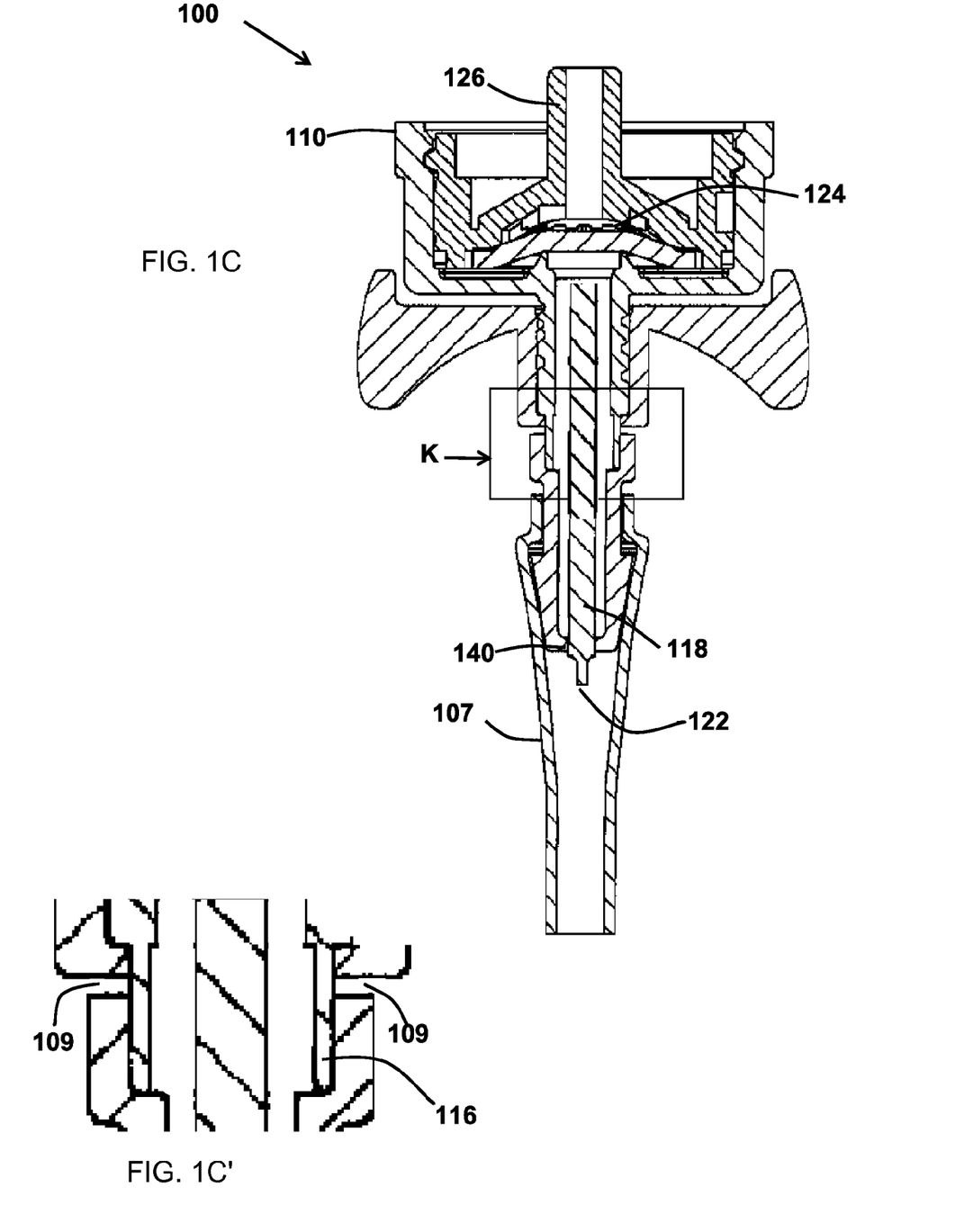
FIG. 1C is a first embodiment of a flushing agricultural emitter filter cleaner in a closed mode.

Referring now to the drawings, FIGS. 1a-c illustrate a first exemplary filtering emitter 100. In filtering emitter 100, a filter includes a filtering element and a cofiltering element. The filtering element moves linearly with respect to the cofiltering element. In an operational mode, the two elements define one or more narrow channels that allow fluid to enter but remove particles. Preferentially, in the operational mode, substantially all fluid exits an irrigation outlet. In a flushed mode, a flushing channel is opened and the filtering element is optionally separated from the cofiltering element allowing fluid passing through the inlet to wash solid matter through the filter and out the flushing outlet.

In exemplary filtering emitter 100, the unclogging filter is integrated with an agricultural drip emitter. A filtering element 118 has an elongated shape and is disposed to move longitudinally along an inlet conduit 104. In a first, operational, position (FIG. 1a), filtering element 118 is aligned with a cofiltering element. A narrow channel 119 between filtering element 118 and the cofiltering element allows fluid to enter the inlet while blocking particles. Simultaneously, in the operational position, a flushing channel 109 is blocked. Therefore, substantially all fluid entering the inlet is directed out an irrigation outlet (126 see FIG. 1c).

In a second, flushing, position (FIG. 1b), filtering element 118 is positioned clear of the cofiltering element thereby opening up narrow channels 119 to allow particles to enter the emitter. In addition, in the flushing mode, one or more flushing channels 109 are open. In the flushing mode, solids that had been trapped by narrow channels 119 are released. Released solids, which in some cases will include solids from the source tubule, are flushed through the emitter and out of flushing channels 109.

In a third, optional closed, position (FIG. 1c) filtering element 118 blocks flow. FIG. 1a is a longitudinal cutaway illustration of exemplary filtering emitter 100 in an operational mode. FIG. 1a shows inlet conduit 104 attached to a fluid source (tubule 107). Tubule 107 branches from a main irrigation pipe (not shown).

Optionally, filtering emitter 100 includes constriction 140 near the inlet of the emitter. In the exemplary embodiment, in the operational mode, a narrow tip projection 122 of filtering element 118 is aligned with constriction 140. This forms a narrow channel 119 between element 118 and the inner walls of constriction 140. Narrow channel 119 allows water to enter the emitter, but blocks particles. Thus, constriction 140 acts as a cofiltering element. In some embodiments, instead of or in addition to a constriction the cofiltering element may include the walls of the inlet conduit, a baffle, a grating, an aperture, a notch, and/or a channel. In some embodiments, the tip of the filtering element may be rounded, tapered and/or flat.

Figure 1D:
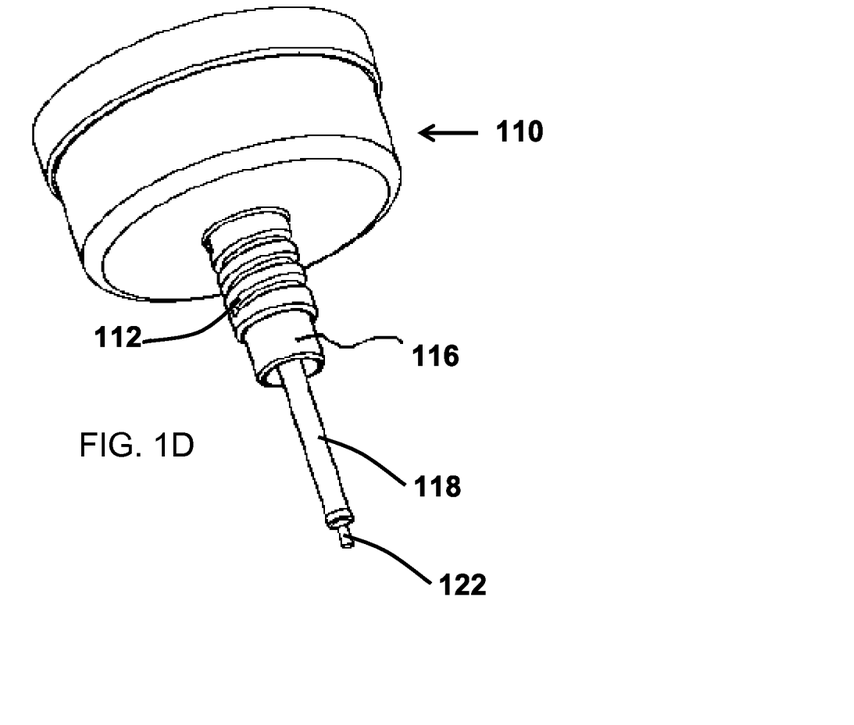
FIG. 1D is a perspective view of a body portion of a first embodiment of a flushing agricultural emitter filter cleaner.

An optional sleeve 116 is integrally formed with a body 110 of the emitter and with filtering element 118 (see FIG. 1d). In the operational mode sleeve 116 blocks flushing channels 109. Therefore, water that enters the inlet is directed to agricultural outlet 126 (see FIG. 1c). In some embodiments, in addition to or in place of sleeve 116 a separate element and/or the body of filtering element 118 may block flushing channels 109.

FIG. 1b illustrates exemplary filtering emitter 100 in the flushing mode. Because tubule 107 is narrow, dirt may block tubule 107. Conventionally, emitters or filters at the end of the tubule retain solids and prevent them from being flushed out the system. Exemplary filtering emitter 100 offers a solution to this problem by supplying a flushing mode. In the flushing mode, exemplary filtering emitter 100 allows solids to be flushed from tubule 107 out of flushing channels 109. In the exemplary embodiment of filtering emitter 100, this is achieved by retracting filtering element 118 and sleeve 116 longitudinally up conduit 104. Retraction simultaneously clears constriction 140 and opens flushing channels 109. Therefore, in the flushing mode, particles exiting tubule 107 through conduit 104 are not retained by the filter and do not block the emitter, but are flushed out flushing channels 109.

FIG. 1c illustrates filtering emitter 100 connected to an emitter body 110. Emitter body 110 optionally includes a flow-restricting regulator 124.

In FIG. 1c, filter element 118 is in an optional closed position. In the closed mode, filtering element 118 extends out of constriction 140 and blocks constriction 140. FIG. 1c' is a close up cutaway view of section K of FIG. 1c. In FIG. 1c' it is seen that in filtering emitter 100 when the inlet filter is in the closed mode, sleeve 116 closes flushing ports 109.

Figure 1E:
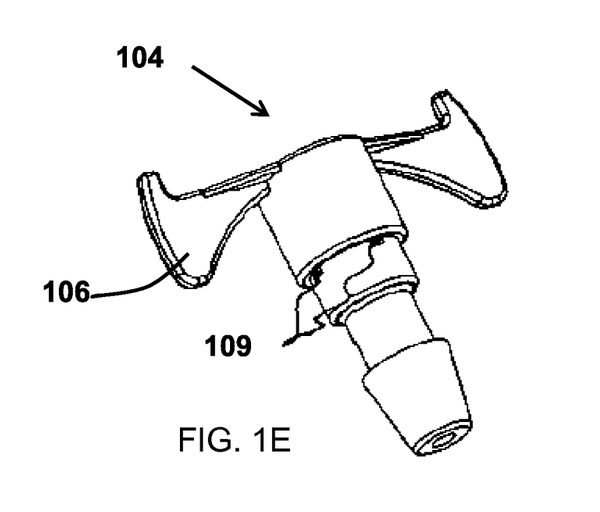
FIG. 1E is a perspective view of an input conduit of a first embodiment of a flushing agricultural emitter filter cleaner.

In order to illustrate one possible example of how a user may change states of a filtering emitter in some embodiments, FIG. 1d and FIG. 1e illustrate body 110 and conduit 104 respectively in a perspective view. Optionally, Body 110 and filtering element 118 are integrally formed into one unit (alternatively, they may be rigidly joined).

In exemplary filtering emitter 100, a screw thread 112 connects conduit 104 to body 110. A handle 106 is provided to facilitate a rotation of conduit 104 by a user, thereby screwing body 110 towards or away from conduit 104. Screwing body 110 fully together with conduit 104 extends filtering element 118 into the closed mode. Conduit 104 is distanced from body 100 by rotation of the screw threads, thereby retracting filtering element 118 into conduit 104. Partially retracting filter element 118 opens narrow channels 119 and places filtering emitter 100 into the operational mode. In some embodiments, progressively retracting element 118 progressively enlarges channels 119. Further unscrewing places the filter into the flushing mode. In some embodiments, optional marks may be provided to indicate to the user the degree of separation between filtering element 118 and constriction 140 (and the size of narrow channel 119). In some embodiments, a threaded tooth may also be provided to prevent conduit 104 from being fully unscrewed and separated from body 110.

The illustrated filtering element 118 has a diameter of for example between 1.5-3.0 mm. Projection 122 has of length of for example between 0.5-2.0 mm and diameter of for example between 0.5-2.0 mm. The displacement between the closed and flushing modes is for example between 1.0-2.5 mm. In some embodiments, some or all of the elements may have significantly different dimensions.

FIGS. 2a-e illustrate a second exemplary embodiment of a flushable irrigation emitter filter 200. Filter 200 is optionally a stand-alone apparatus for reversible connection to an irrigation emitter. In alternative embodiments in place of or in addition to a reversible connector, Filter 200 may be irreversibly connected to an agricultural emitter.

Filter 200 includes a main body 217 having three ports: an inlet conduit 204, and an irrigation outlet 226 and a flushing outlet 209. Repositioning a movable element 218 switches filter 200 between modes. In the example of filter 200 there are three modes: a filtering mode (FIG. 2a) where incoming fluid is filtered and directed out irrigation outlet 226; a flushing mode (FIG. 2c) where fluid flushes particles out flushing outlet 209; and an optional closed mode (FIG. 2b) where flow is blocked.

Figure 2A:
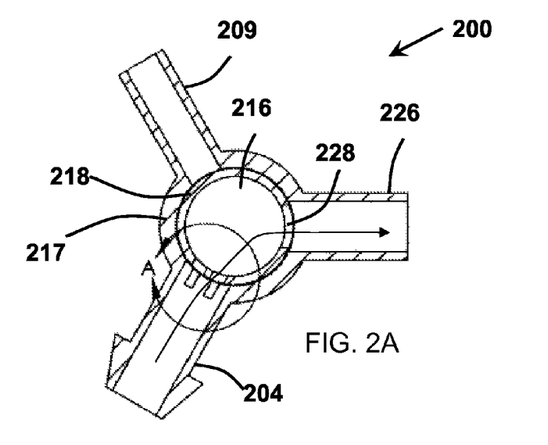
FIG. 2A is a cutaway view of a second embodiment of a flushing agricultural filter in an operational mode.
Figure 2B:
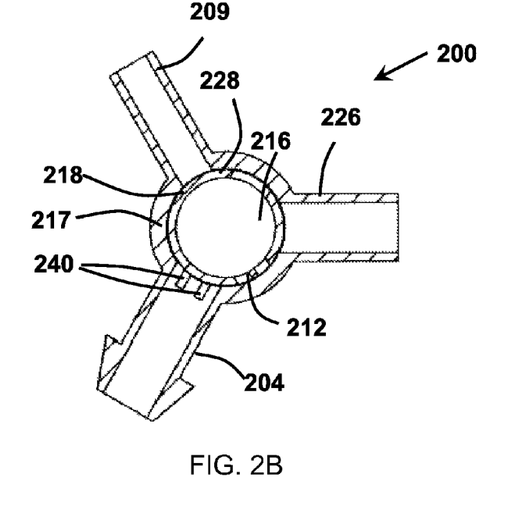
FIG. 2B is a cutaway view of a second embodiment of a flushing agricultural filter in an operational mode.
Figure 2C:
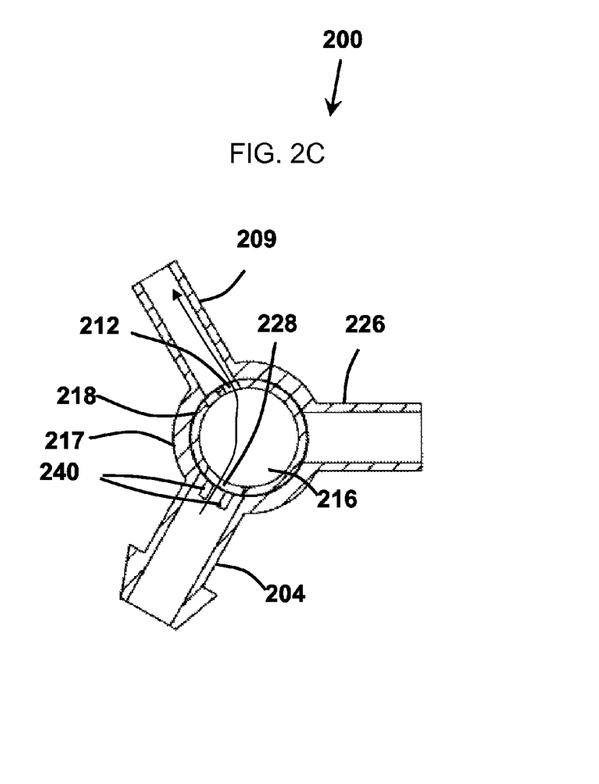
FIG. 2C is a cutaway view of a second embodiment of a flushing agricultural filter in an operational mode.

In filter 200, movable element 218 includes two apertures: a filtering aperture 212 containing a slotted filtering element and an unobstructed aperture 228. Movable element 218 is cylindrical and is mounted concentrically within a cylindrical cavity 216 in body 217. Movable element 218 is free to rotate within cavity 216 around the shared axis. In alternative embodiments, there may be only an operational mode and a flushing mode or there may be additional or alternative modes. Optionally, a rotating movable element could be conical or semispherical or have any other rotationally symmetric form. In some embodiments, a moving element may slide linearly within a main body. In possible embodiments, the movable element and/or body may be elongated, flattened, rectangular and/or have some other shape. In filter 200, unobstructed aperture 228 is completely open, in some embodiments there may be a partially obstructed aperture in place of or in addition to the unobstructed aperture. In FIGS. 2a-c, movable element 218 is optionally hollow; in some embodiments, the movable element may be solid with channels that join some or all of the apertures in the movable element. The channels may be configured to prevent build up of solid materials within the movable element.

In the example, rotatable element 218 within cavity 216 determines fluid communication amongst the three ports: inlet conduit 204, irrigation outlet 226 and flushing outlet 209 as explained herein below.

A cofiltering element 240 is located between inlet conduit 204 and cavity 216 in body 217. In the exemplary embodiment of filter 200, cofiltering element 240 includes baffles. Some embodiments may include other cofiltering elements in place of or in addition to baffles. For example, a cofiltering element may include a constriction, a mesh, and/or radial or linearly mounted bars.

FIG. 2a is a cutaway illustration of exemplary filter 200 is an operational mode. FIG. 2a' is a detailed view of area A of FIG. 2a. In the operational mode, filtering aperture 212 and the slotted filtering element are aligned with inlet conduit 204 and cofiltering element 240. Then, cofiltering element 240 partially blocks slits in the slotted filtering element in filtering aperture 212. This leaves only narrow channels 219 open between inlet conduit 204 and cavity 216. Narrow channels 219 allow fluid to pass into cavity 216 but block particles. In some embodiments, the filtering element may include holes or slots of uneven width or different shapes in addition to or in place of slits. In some embodiments, adjusting the position of the movable element may define the filtering effect (for example excluding or passing larger or smaller particles). The outlet opening near the emitter may also be wide enough to allow multiple filtering positions, in some embodiments.

In the operational mode, unobstructed aperture 228 is aligned with irrigation outlet 226, while the wall of element 218 blocks flushing outlet 209. Thus fluid entering inlet conduit 204 is directed out through irrigation outlet 226.

FIG. 2b illustrates exemplary filter 200 in an optional closed mode. In the closed mode, the walls of body 217 block filtering aperture 212 and unobstructed aperture 228. Therefore, flow does not pass through cavity 216 and there is no fluid communication between the ports.

FIG. 2c illustrates exemplary filter 200 in a flushing mode. In the flushing mode, filtering aperture 212 is aligned with flushing outlet 209 and unobstructed aperture 228 is aligned with inlet conduit 204. In this mode, unobstructed aperture 228 is in fluid communication with inlet conduit 204, and fluid flowing into inlet conduit 204 exits through flushing outlet 209.

In the flushing mode, filtering aperture 212 and the filtering element are separated from cofiltering element 240, and, therefore, cofiltering element 240 does not obstruct the slits in filtering aperture 212. Some particles that were trapped on the obstructed slits of filtering aperture 212 during the operational mode may pass through the unobstructed slits and exit flushing outlet 209 in the flushing mode. Similarly, when cofiltering element 240 is separated from filtering aperture 212, larger particle can pass freely through inlet conduit 204 into cavity. Thus, in the flushing mode, some particles from the fluid source (for example tubule 107) are flushed through inlet conduit 204 and out flushing outlet 209.

In addition, in the exemplary embodiment of filter 200 in the flushing mode, the direction of flow through filtering aperture 212 is reversed with respect to the operational mode. Therefore, during the flushing mode, slits in the filtering element of filtering aperture 212 are backwashed, unclogging element 218.

Figure 2D:
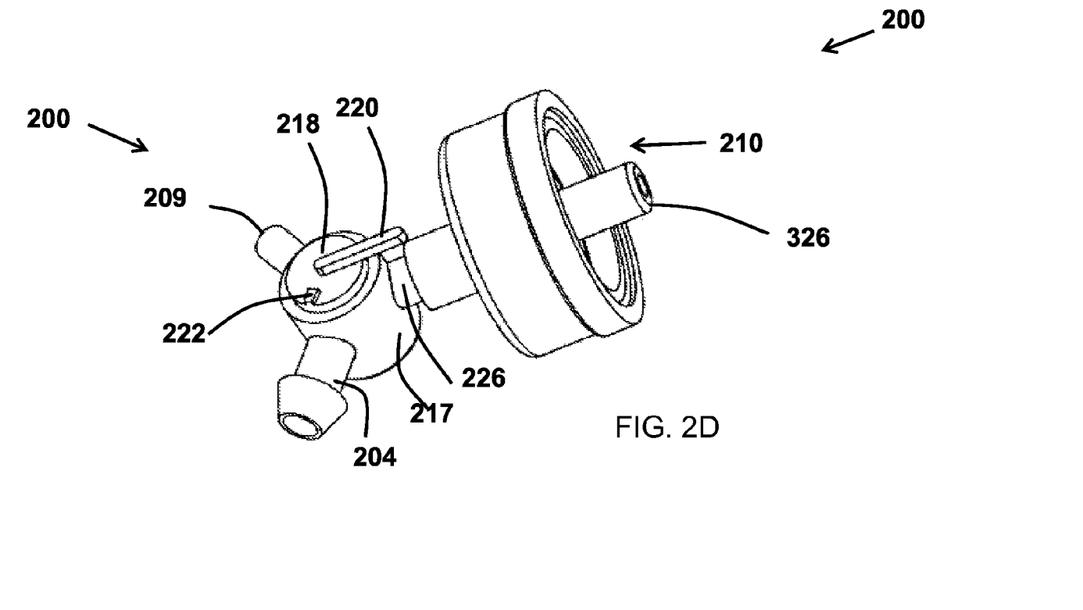
FIG. 2D is a cutaway view of a second embodiment of a flushing agricultural filter in an operational mode.

FIG. 2d illustrates a perspective view of exemplary filter 200 in operational mode. An optional emitter body 210 is shown mounted onto filter 200. In some embodiments, emitter body 210 and filter body 217 could be formed as a single integrated piece. In some embodiments, an irrigation tube or tubule may connect irrigation outlet 226 to one or more emitters. Some embodiments may include multiple inlets or outlets that may be activated simultaneously or separately. Emitter body 210 includes a flow restrictor (not shown) and an emitter outlet 326.

Optionally, a handle 220 is provided to facilitate rotation of movable element 218 thereby switching modes. In the example of FIG. 2d, handle 220 points in the direction of unobstructed aperture 228. An optional marker 222 shows the location of filtering aperture 212. Accordingly, FIG. 2d shows exemplary filter 200 in the operational mode wherein filtering aperture 212 and marker 222 are aligned with inlet conduit 204 while unobstructed aperture 228 and handle 220 are aligned with irrigation outlet 226.

Figure 2E:
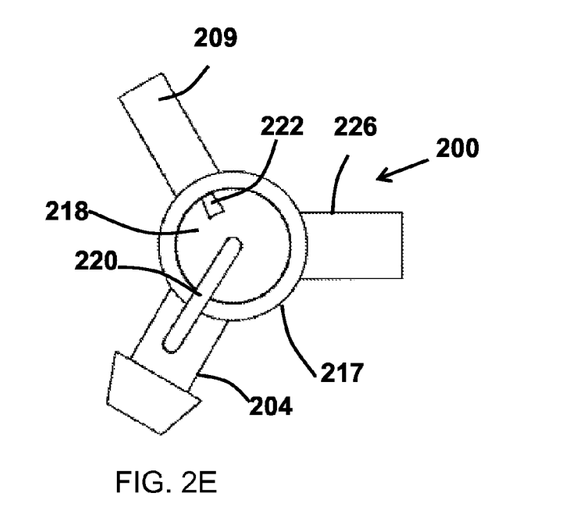
FIG. 2E is a cutaway view of a second embodiment of a flushing agricultural filter in an operational mode.

FIG. 2e illustrates an external view of filter 200 in the flushing mode.

Is some embodiments, the unclogging filter may be held steady in use by its connection to the fluid source. In some embodiments, the filter may be configured for securing to the ground (for example via a stake) and/or for securing to an irrigation pipe (for example by supplying a tab for securing with a tube clamp or nylon tie and/or via an integrally formed tying or clamping element).

In the exemplary embodiment of filter 200, the internal diameters of conduit 204, outlet 209 and/or outlet 226 and/or aperture 212 and/or aperture 228 may be for example between 2.0 and 4.5 mm. Cavity 216 may have an inner diameter for example between 2.0-6.0 mm and a depth for example between 2.0-6.0 mm. In some embodiments, filtering element and cofiltering element 240 may be designed to pass particles of for example less then between 0.5-2.0 mm when separated and for example of less than between 0.3-0.5 mm when aligned. Optionally, in the separated state, cofiltering element 240 may be designed to filter out smaller particles than the filtering element.

Figure 3:
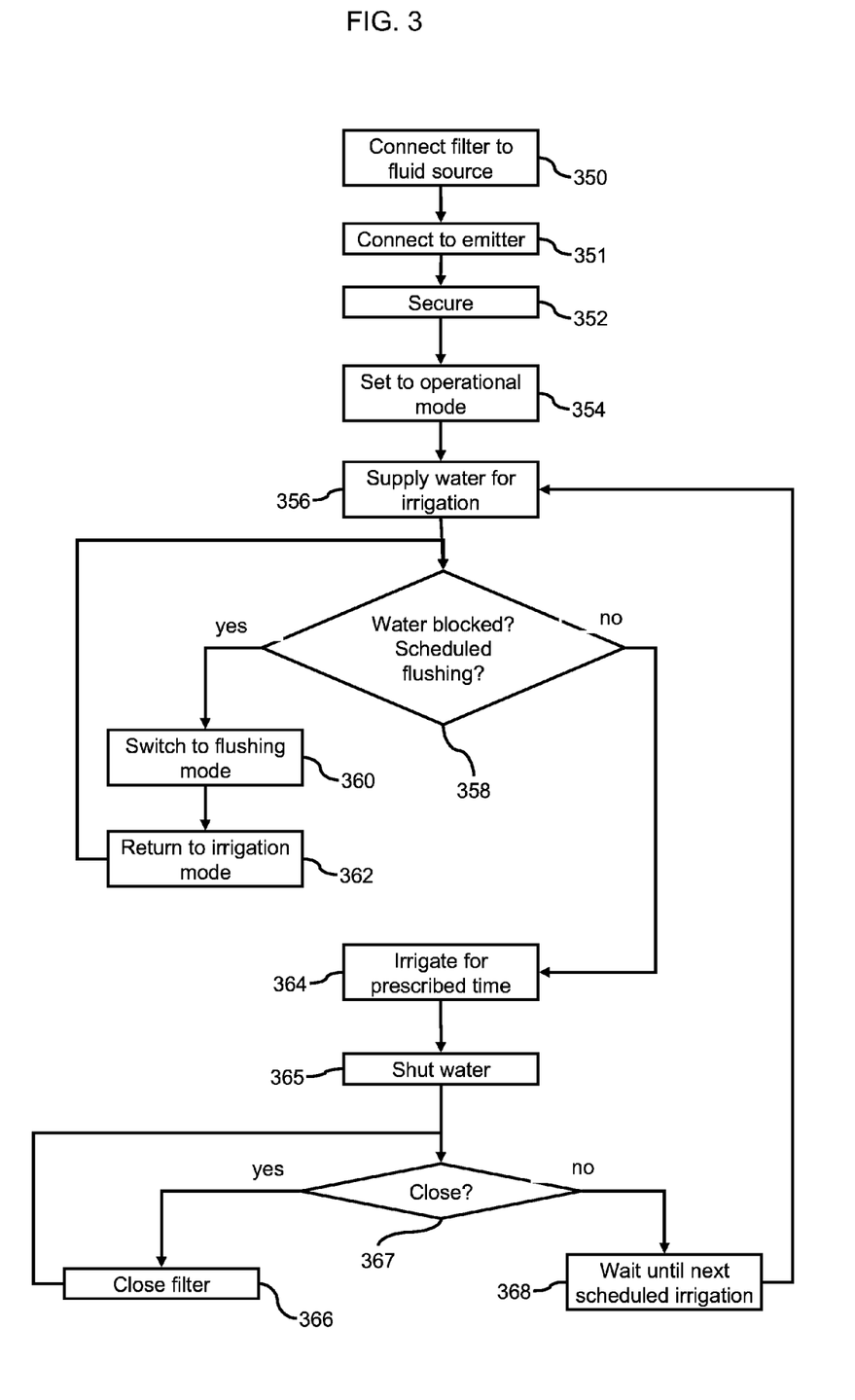
FIG. 3 is a flowchart illustrating use of an unclogging filter in an agricultural field.

FIG. 3 is a flowchart illustrating method for irrigating one or many plants. For example, we consider a first plant needing four liters of water per day and a second needing two liters and emitters designed to produces a flow rate of two l/hr under 0.5-3.0 bar inlet pressure. Two emitters are installed near the first plant and a single emitter is installed near the second plant. First, the inlet of the filter is connected 350 to a fluid source. A typical example of a fluid source is a pressurized agricultural hose or tubule, and preferentially, the inlet will have an optional barbed shoulder designed to secure the inlet into the hole or the tubule.

In cases where the filter does not include an integrated emitter, the user will connect 351 the outlet of the filter to one or more agricultural emitters. The connection may for example be direct or via a tubule. A single filter may be connected to one or more emitters.

The emitter/filter is secured 352 near the plant to be watered. Securing can be via the connecting 350 to the irrigation tube (in some cases the tube itself may be staked to the ground). Securing could also include connecting the filter to a stake or tying it to a plant or the irrigations tube.

Once installed, the filter is set 354 to an operational mode and water is supplied 356 for irrigation. If the water not emitted 358 then the emitter or the fluid source may be clogged.

To unclog the system, the filter is switched 360 to the flushing mode. Particles retained on the filter or in some cases particles in the source tubule are then flushed out of the flushing outlet and the filter is returned 362 to the irrigation mode. If still no water is emitted 358, then it is attempted to clean the emitter by switching 360 again to flushing mode.

Optionally, rather than constantly checking whether each emitter is working properly and unclogging the emitter when it is not working, flushing may be performed periodically and/or on a regular basis, whether or not the emitter is clogged (for instance a worker may go around the field unclogging emitters in a monthly cycle).

If water is emitted 358 properly, then irrigation 364 continues for the prescribed watering time (e.g. in the example, 1 hour) and the water is then shut off 365.

Optionally, at times 367, an emitter filter may be closed 366. For example, if a plant dies or is removed, the local emitter filter may be closed 366 until a new plant is brought. In some embodiments, the emitter may not have a closing option.

Once irrigation ends, the system is left in a waiting 368 without water until the next scheduled irrigation.

It is expected that during the life of a patent maturing from this application many relevant technologies will be developed and the scope of the terms is intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. An apparatus for filtering a fluid for an irrigation emitter comprising:
   a) an irrigation outlet;
   b) a flushing outlet;
   c) an inlet conduit connectable to a source of the fluid;
   d) a cofiltering element; and
   e) a cavity in fluid communication with said irrigation outlet, said flushing outlet and said inlet conduit;
   f) a rotational element including a filtering element, said filtering element including a filtering aperture said rotational element mounted in said cavity for rotating therein; said rotational element rotating between at least two positions within said cavity, said at least two positions including:
      i) an operational position wherein substantially all of the fluid flowing into said inlet conduit is directed through said filtering element to said irrigation outlet, and in said operational position said cofiltering element is aligned with and partially blocks said filtering aperture allowing fluid flow through said filtering aperture and preventing a particle from passing through said filtering aperture; and
      ii) a flushing position for flushing said particle out of said apparatus through said flushing outlet, and wherein in said flushing position at least a portion of fluid flowing into said inlet conduit flows through said filtering aperture and out said flushing outlet, and wherein in said flushing position, fluid flows through said filtering aperture in a reversed direction with respect to a direction of flowing through said filtering aperture in said operational position, backwashing said filtering aperture, and wherein in said flushing position, said cofiltering element is separated from said filtering aperture to permit fluid including said particle to flow through said filtering aperture in said reversed direction.

2. The apparatus of claim 1, wherein said rotational element is mounted in said cavity for rotating between at least three positions including:
 i) said at least two positions and
 ii) a closed position in which flow through the apparatus is blocked.

3. The apparatus of claim 1, wherein said irrigation outlet is configured for reversible attachment to at least one device selected from the group consisting of an agricultural emitter, and an irrigation tubule.

4. The apparatus of claim 1, wherein said irrigation outlet is irreversibly attached to at least one device selected from the group consisting of an agricultural emitter, and an irrigation tubule.

5. The apparatus of claim 1, wherein said inlet conduit has an inner diameter of between 1.0 and 3.5 mm.

6. The apparatus of claim 1, wherein said filtering element and said cofiltering element are configured for said preventing said particle when said particle has a diameter of greater than 0.5 mm.

7. The apparatus of claim 1 further comprising:
 h) a wall of said rotational element and wherein said wall defines said filtering element including said filtering aperture.

8. The apparatus of claim 1 wherein in said operational position said filtering element and said cofiltering element form a narrow channel.

9. The apparatus of claim 1 wherein in said flushing position said particle passes through said cofiltering element.

10. The apparatus of claim 1, wherein when said cofiltering element is separated from said filtering element said cofiltering element is designed to filter out a smaller particle than the filtering element.

11. The apparatus of claim 1, wherein said cavity is substantially cylindrical and said rotational element is cylindrical.

* * * * *